United States Patent

[11] 3,600,906

| [72] | Inventor | Forrest O. E. Schultz |
| | | Owosso, Mich. |
| [21] | Appl. No. | 846,506 |
| [22] | Filed | July 31, 1969 |
| [45] | Patented | Aug. 24, 1971 |
| [73] | Assignee | Midland-Ross Corporation |
| | | Toledo, Ohio |

[54] CONSTANT SPEED DRIVE
5 Claims, 2 Drawing Figs.

[52] U.S. Cl. .................................................. 64/30,
192/104 B
[51] Int. Cl. .................................................. F16d 7/02
[50] Field of Search .......................................... 64/30;
74/64, 208, 209; 192/104 B

[56] References Cited
UNITED STATES PATENTS
3,345,833  10/1967  Burrows ...................... 64/30

Primary Examiner—Mark M. Newman
Assistant Examiner—Randall Heald
Attorneys—Peter Vrahotes and Harold F. Mensing ABSTRACT: A constant speed drive mechanism wherein a drive member contacts a driven member through frictional surfaces and the frictional force engaging these two surfaces is varied relative to the speed of rotation of the driven member. At low speed, the frictional surfaces are urged into engagement by biasing means acting on a plurality of flyweights and, as the rotational speed of the driven member increases, the flyweights react from centrifugal force to overcome the biasing means, thereby reducing the frictional force on the surfaces.

PATENTED AUG 24 1971

3,600,906

INVENTOR.
FORREST O. E. SCHULTZ
BY
Peter Vrahotes
ATTORNEY

CONSTANT SPEED DRIVE

In the operation of automobile accessories such as power-steering units, alternators, air-conditioning pumps and the like, it is common practice to provide means for rotating the accessories at higher rotational speeds than the speed of the engine, or drive member. The ratio of accessory r.p.m. to engine r.p.m. is frequently in the order of 3:1. This is practiced so that adequate rotational speeds are achieved to operate the accessories efficiently when the engine is idling or in slow traffic. After the vehicle is subsequently operated at turnpike speeds, the fixed ratio drives of the various accessories result in excessive speeds of the units, wasting power, and subjecting them to undue wear and possible overheating. Ratio reducing means of the prior art usually involves some type of device utilizing centrifugal force to gradually reduce the ratio of r.p.m. in the accessory relative to the r.p.m. of the engine over a long range, with the result that the accessory continually increases its rotational speed as the engine rotates faster, although at a slower rate of increase. It obviously would be desirable to provide a drive mechanism having a constant speed, which would ideally be at the maximum efficiency of the accessory.

It is, therefore, an object of this invention to provide a constant speed drive having a substantially constant output speed over a relatively wide range of input speed.

It is a further object of this invention to provide a device that limits the power drain of an engine for turning accessories after the accessory attains the speed required for maximum efficiency.

It is another object of this invention to provide a constant speed drive device utilizing a plurality of flyweights having associated therewith biasing means that equally distribute the forces urging the flyweights into engagement with the driven member.

Other and further objects and advantages of the invention will become apparent from the following detailed description of a preferred embodiment thereof, reference being made to the accompanying drawing, in which.

Figure 1:
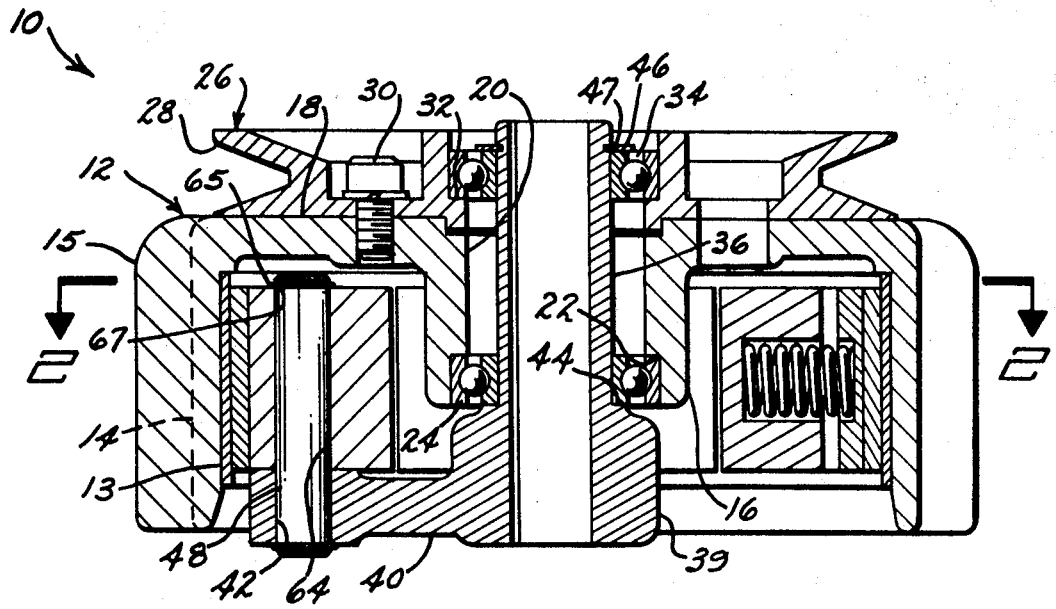
FIG. 1 shows a cross-sectional view in elevation of an embodiment of the present invention.

Referring now to the drawing, a constant speed drive mechanism is shown generally at 10 having a driving member, or housing 12, with an annular drum member 14 and a hub 16. The drum 14 has an inner frictional surface 13 and cooling fins 15 secured to the outer perimeter thereof. The hub 16 has a central opening 20 therein and is connected to the drum 14 by a disklike portion 18. The inner perimeter of the hub 16 defines a shoulder 22.

Attached to the disk 18 is an annular pulley 26 having a peripheral V-type groove 28 therein, to which a V-type belt may be connected for rotation thereof, and the inner perimeter of the pulley defines a pair of shoulders 22, 32. The pulley 26 may be secured to the disk 18 by any convenient means, such as screw and lockwasher assemblies 30. Although the housing 12 has been described as comprising a plurality of components, it will be evident that drum 14, surface 13, disk 18, hub 16, and pulley 26 may be integral to form a single housing unit.

Located within the housing 12 and rotatably secured thereto by ball bearing assemblies 24 and 34 is a driven member, or spider, 36 which has a sleeve portion 38. The spider 36 has an expanded section 39 at one end thereof. A plurality of arms 40 are integral with and extend radially from the expanded section 39. Each arm 40 has an opening 42 near its outermost end.

The expanded section 39 defines a second shoulder 44 that abuts the ball bearing assembly 24. A snapring 46 received within a groove 47 of the sleeve 38 retains the ball bearing 34. Through cooperation with the shoulders 22 and 32, on housing 12 and pulley 26 respectfully, axial movement of the spider with respect to the housing is thereby restrained.

Rigidly secured within each arm opening 42 is a stub shaft, or pin, 48, which extends into the cavity of the housing 12.

A plurality of flyweights 58 are pivotally located within the housing and each has an opening 64 which receives a pin 48 and the flyweights are axially retained thereon by snaprings 65 in grooves 67 of the pins. Each flyweight 58 consists of a weighted portion 60 and a bladelike light portion 62, circumferentially opposed to each other with respect to the pivot opening 64 therein. The mass of the weighted portion 60 is significantly greater than the mass of the blade 62.

The weighted portion 60 has a bore 68 located therein to receive one end of a spring 70. The blade 62 has a bore 69 located therein to receive the opposite end of a spring 70. The blade 62 is further provided with a lining member 66, such as conventional clutch facing or brake lining, securely fixed thereto for frictional engagement with the surface 13.

The plurality of flyweights 58 are so arranged in the complete drive assembly that each spring 70 tends to force the lining member 66 of one flyweight radially outward against the frictional surface 13 as it also tends to force the lining member 66 of an adjacent flyweight radially outwardly by means of the lever, or fulcrum action, about a pin 48 received within opening 64 of the adjacent flyweight.

In operation, maximum torque is transmittable when the device is at rest or driven at low speeds. Under this condition each spring 70 imparts its maximum thrust to urge the lining 66 into contact with the inner surface 13. As the rotational speed of the housing 12 is increased, the weighted portion 60 of the flyweights 58 tend to move radially outwardly due to centrifugal force. The centrifugal force will thus tend to overcome the biasing force of the spring 70 and cause slippage between the frictional surface 13 and the linings 66. As the weighted portion of each flyweight 58 moves radially outwardly and the blade portion of the adjacent flyweight moves inwardly, the biasing force of the spring 70 increases due to compression, thus tending to counter the effect of the flyweight action, However, centrifugal force increases as the square of angular velocity, whereas the spring 70 bias increases by a linear function. Equilibrium is reached when the power requirement is exactly met by the frictional force between the driven member 36 and driving member 12. As the flyweights 58 are associated with the driven member 36, the frictional force becomes a function of speed of the driven member. It will thus be seen that a well defined speed for any given requirement can be readily achieved through proper selection of spring force and rate, in combination with the weight value of the weighted portion of the flyweights 58.

Figure 2:
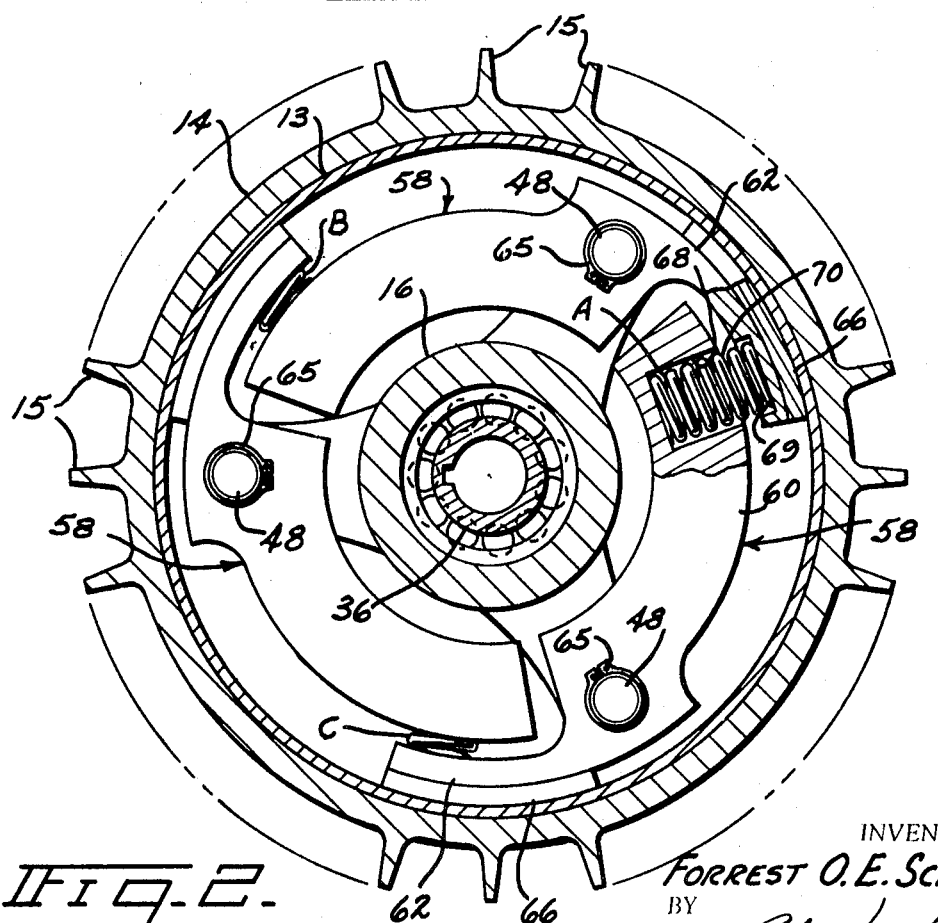
FIG. 2 is a cross-sectional view of the device shown in FIG. 1 taken along the lines 2—2.

It is an important feature of the arrangement of springs 70 that any variation in load among them that normally occurs as a manufacturing tolerance will tend to equalize among the linings 66, and thus more uniformly distribute the frictional force against surface 13. To visualize this, let it be assumed that a mean radial force exists at the linings 66 of 50 pounds each. If springs abutting some fixed base were used, each would be loaded to 50 pounds. A normal manufacturing tolerance for springs of this nature is plus or minus 10 percent, which could result in a force variable between linings of 55 pounds to 45 pounds. IN the constant speed drive mechanism 10, assuming a flyweight 58 lever arm ratio of 1.5:1 (this ratio is arbitrary), this same 50 pound mean force is attained at the lining by using a 20 pound spring at each location. There is the direct thrust of 20 pounds plus the thrust of 1.5×20 or 30 pounds through the lever action of flyweight 58 from an adjacent spring 70. Referring to FIG. 2 and applying the normal tolerance of plus or minus 10 percent to the spring loads, the most unfavorable imbalance exists when the spring load values are as follows: spring "A" has a thrust of 22 pounds, spring "B" a thrust of 18 pounds, and spring "C" a thrust of 18 pounds. The force on the lining member radially adjacent the spring labeled "A" is 22 pounds plus 1.5×18 or 27 pounds applied by spring labeled "B" through blade 62 for a total of 49 pounds. Similarly, the force on the lining member 66 radially adjacent the spring labeled "B" is equal to 18 pounds plus 1.5×18 or 27 pounds applied by spring labeled "C" through the blade 62 for a total of 45 pounds, and the force on the lining member radially adjacent the spring labeled "C" is equal to 18 pounds plus 1.5×22 or 33 pounds applied by spring labeled "A" through blade 62 for a total of 51 pounds. The spread between the maximum and minimum loads in our unit is 51 minus 45, or 6 pounds, as opposed to 55 minus 45, or 10 pounds, in the case of singly acting springs. The benefits of equalization of lining forces will be manifest in longer service life, less localized heat buildup and a smoother clutching action, particularly at the lower overrunning speed differentials. A further advantage in this configuration is to be gained by virtue of having 20 pound springs perform the work normally requiring 50 pound springs.

Although only a single embodiment has been shown and described, it will be appreciated that the description is for purposes of illustration only, without there being any intent to limit the scope of the invention except insofar as defined by the appended claims.

I claim:

1. A drive mechanism comprising: a driving member a driven member rotatably received within said driving member, said driven member having a plurality of radially extending arms, flyweights pivotally mounted at the outer ends of said arms, said flyweights having a first end on one side of the pivoted location and a second end on the other side, said first end being spaced relative to said driving member, said second end having weight in excess of said first end, a portion of said first end of each flyweight extending over and being spaced relative to a portion of the second end of an adjacent flyweight, and biasing means disposed between said first and second end portions of adjacent flyweights urging said first end into contact with said driving member.

2. The drive mechanism of claim 1 wherein said contacting portion of said first end comprises a frictional material.

3. A constant speed drive mechanism comprising: a housing having a generally annular portion, a central hub member, and mans for securing said hub member to said annular portion, a driven member received within said hub opening, said driven member being free to rotate relative to said housing, a plurality of arms fixedly secured to and radially extending from said driven member, a plurality of flyweights peripherally spaced about said driven member, each of said flyweights being pivotally mounted on an arm, a peripherally extending blade integral to a first end of said flyweights, said blade being spaced relative to said annular portion and extending over the second end of an adjacent flyweight, biasing means intermediate each of said blades and its adjacent flyweight, said biasing means urging said blades into contact with said annular portion and pivotally urging said flyweight about its pivotal mounting, and means for rotating said housing.

4. A constant speed drive mechanism comprising: a housing having a generally annular portion, a central hub member with an axially extending opening therein and means for securing said hub member to said annular member, a spider member rotatably received within said hub opening, a plurality of radially extending arms secured to said spider member, a plurality of peripherally spaced, arcuate flyweights pivotally mounted on said arms, a peripherally extending blade integral to a first end of said flyweights, said blade being spaced relative to said annular portion, the second end of said flyweight being of greater weight than the first end, biasing means intermediate each of said blades and said spider member, said biasing means being operative to engage the inside perimeter of each of said blades thereby urging said blade into contact with said annular portion and means for rotating said housing.

5. The drive mechanism of claim 4 wherein each of said blades extends over the second end of an adjacent flyweight and said biasing means is disposed therebetween.